(12) United States Patent
Hedesiu et al.

(10) Patent No.: US 10,202,504 B2
(45) Date of Patent: Feb. 12, 2019

(54) POLYETHYLENE COMPOSITION WITH HIGH FLEXIBILITY AND HIGH TEMPERATURE RESISTANCE SUITABLE FOR PIPE APPLICATIONS

(71) Applicants: BOREALIS AG, Vienna (AT); ABU DHABI POLYMERS COMPANY LIMITED (BOROUGE), Abu Dhabi (AE)

(72) Inventors: Cristian Hedesiu, Abu Dhabi (AE); Antti Tynys, Abu Dhabi (AE)

(73) Assignees: BOREALIS AG, Vienna (AT); ABU DHABI POLYMERS COMPANY LIMITED (BOROUGE), Abu Dhabi (AE)

( * ) Notice: Subject to any disclaimer, the term of this patent is extended or adjusted under 35 U.S.C. 154(b) by 98 days.

(21) Appl. No.: 15/106,208

(22) PCT Filed: Dec. 18, 2014

(86) PCT No.: PCT/EP2014/003421
§ 371 (c)(1),
(2) Date: Jun. 17, 2016

(87) PCT Pub. No.: WO2015/090596
PCT Pub. Date: Jun. 25, 2015

(65) Prior Publication Data
US 2016/0312017 A1 Oct. 27, 2016

(30) Foreign Application Priority Data
Dec. 20, 2013 (EP) ...................................... 13005980

(51) Int. Cl.
*C08L 23/08* (2006.01)
*F16L 9/12* (2006.01)
*F16L 47/00* (2006.01)

(52) U.S. Cl.
CPC ............. *C08L 23/0815* (2013.01); *F16L 9/12* (2013.01); *F16L 47/00* (2013.01); *C08L 2203/18* (2013.01); *C08L 2205/025* (2013.01); *C08L 2314/02* (2013.01)

(58) Field of Classification Search
CPC ............. C08L 23/0815; C08L 2203/18; C08L 2205/025; C08L 2314/02; F16L 9/12; F16L 47/00
USPC ......................................................... 524/528
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 4,532,311 A | 7/1985 | Fulks et al. |
| 4,582,816 A | 4/1986 | Miro |
| 4,803,251 A | 2/1989 | Goode et al. |
| 4,855,370 A | 8/1989 | Chirillo et al. |
| 5,026,795 A | 6/1991 | Hogan |
| 5,391,654 A | 2/1995 | Ahvenainen et al. |
| 7,411,023 B2 * | 8/2008 | Palmlof ................... C08L 23/06 525/191 |
| 2010/0055366 A1 * | 3/2010 | Palmlof ................... C08L 23/06 428/36.9 |

FOREIGN PATENT DOCUMENTS

| | | | |
|---|---|---|---|
| EP | 0428054 A1 | 5/1991 | |
| EP | 0479186 A2 | 4/1992 | |
| EP | 0560035 A1 | 9/1993 | |
| EP | 0688794 A1 | 12/1995 | |
| EP | 0810235 A2 | 12/1997 | |
| EP | 1359192 A1 | 11/2003 | |
| EP | 1760096 A1 | 3/2007 | |
| EP | 1927627 A1 | 6/2008 | |
| WO | 9951646 A1 | 10/1999 | |
| WO | 0155230 A1 | 8/2001 | |
| WO | WO-03033586 A1 * | 4/2003 | ............. C08L 23/06 |
| WO | 2005118655 A1 | 12/2005 | |
| WO | 2006063771 A1 | 6/2006 | |

OTHER PUBLICATIONS

Heino et al. "Rheological Characterization of Polyethylene Fractions", Theoretical and Applied Rheology, Aug. 1992, pp. 360-362.
Heino. "The Influence of Molecular Structure on some Rheological Properties of Polyethylene", Annual Transactions of the Nordic Rheology Society, 1995, vol. 3, pp. 71-73.
Randall. "A Review of High Resolution Liquid 13Carbon Nuclear Magnetic Resonance Characterizations of Ethylene-based Polymers", Journal of Macromolecular Science, Part C, Dec. 2006, vol. 29: 187, pp. 200-317.
Zhou et al. "A new decoupling method for accurate quantifications of polyethylene copolymer composition and triad sequence distribution with 13C NMR", Journal of Magnetic Resonance, Aug. 2007, vol. 187, pp. 225-233.
Busico et al. "Alk-1-ene Polymerization in the Presence of a Monocyclopentadienyl Zirconium (IV) Acetamidinate Catalyst: Microstructural and Mechanistic Insights", Macromolecular Rapid Communications, May 2007, vol. 28, pp. 1128-1134.

(Continued)

*Primary Examiner* — Michael Bernshteyn
(74) *Attorney, Agent, or Firm* — Roberts Mlotkowski Safran Cole & Calderon, P.C.

(57) ABSTRACT

The present invention relates to a polyethylene composition comprising, preferably consisting of,
a base resin comprising
a copolymer of ethylene and at least two comonomers selected from alpha-olefins having from three to twelve carbon atoms,
wherein the ethylene copolymer comprises a low molecular weight component (A) and a high molecular weight component (B) with the low molecular weight component (A) having a lower weight average molecular weight than the high molecular weight component (B),
and optional additives, suitable for the production of an article, preferably pipe.

14 Claims, No Drawings

(56) References Cited

OTHER PUBLICATIONS

Castignolles et al. "Detection and quantification of branching in polyacrylates by size-exclusions chromatography (SEC) and melt-state 13C NMR spectroscopy", Elsevier Ltd. Polymer 50, 2009, pp. 2373-2383.

Parkinson et al. "Effect of Branch Length on 13C NMR Relaxation Properties in Molten Poly[ethylene-co-(x-olefin)] Model Systems", Macromolecular Chemstry and Physics, Oct. 2007, vol. 208, pp. 2128-2133.

Pollard et al. "Observation of Chain Branching in Polyethylene in the Solid State and Melt via 13C NMR Spectroscopy and melt NMR Relaxation Time Measurements", Macromolecules, Jan. 2004, vol. 37, pp. 813-825.

Klimke et al. "Optimisation and Application of Polyolefin Branch Quantification by Melt-State 13C NMR Spectroscopy", Marcomolecular Chemistry and Physics, Feb. 2006, pp. 382-395.

Kaye et al. "Definition of terms relating to the non-ultimate mechanical properties of polymers", Pure and applied Chemistry, 1998, vol. 70, Nov. 3, pp. 701-754.

Griffin et al. "Low-load rotor-synchronized Hahn-echo pulse train (RS-HEPT) 1H decoupling in solid-state NMR: factors affecting MAS spin-echo dephasing times", Magnetic Resonance in Chemistry, Dec. 2007, vol. 45, pp. S198-S208.

Filip et al. "Heteronuclear decoupling under fast MAS by a rotor-synchronized Hahn-echo pulse train", Journal of Magnetic Resonance, 2005, vol. 176, pp. 239-243.

International Preliminary Report on Patentability of International Application No. PCT/EP2014/003421 dated Jun. 21, 2016.

International Search Report and Written Opinion of the International Searching Authority; PCT/EP2014/003421 dated Apr. 8, 2015.

* cited by examiner

POLYETHYLENE COMPOSITION WITH HIGH FLEXIBILITY AND HIGH TEMPERATURE RESISTANCE SUITABLE FOR PIPE APPLICATIONS

The present invention relates to polyethylene, particularly polyethylene for pipe applications. The invention further relates to a process for the production of polyethylene.

BACKGROUND OF THE INVENTION

Pipes, in particular pressure pipes, are used in various applications like high temperature resistant pipe applications.

However, polyethylene has a limited pressure resistance at elevated temperature. Especially, it is difficult to combine good pressure resistance at higher temperatures with a high flexibility of the piping materials.

For improving pipe performance at elevated temperature density of the polyethylene pipe resin can be increased. However, increasing density as the additional effect of increasing the flexural and the tensile modulus of the material, which makes the material stiffer and less flexible. Furthermore, increasing density renders the polyethylene material more brittle. For many applications, however, such as e.g. floor heating, flexible pipes are preferred due to easier installation of flexible pipes.

Alternatively, pipe performance at elevated temperature can be improved by decreasing the melt flow rate $MFR_5$ of the polyethylene resin. However, a lower $MFR_5$ has a negative effect on the processability of the material which limits the maximum line speed and also might lead to polymer degradation during pipe extrusion.

In several applications, such as e.g. heat exchangers, wide temperature range from −40° C. to 70° C. is desired. The need for the wide service temperature range limits the usability of polypropylene random copolymer pipe grades in these applications. Polypropylene random copolymer pipe grades have a relatively good hydrostatic pressure resistance at elevated temperatures, but due to inherent poor mechanical performance of polypropylene at temperatures below 0° C. they cannot be used in applications in which low temperature performance is required.

The main challenge in the development of polyethylene grade for the above described applications has been to find the optimal balance between flexibility, processability and good pipe surface quality while still meeting the requirements of DIN 16833 and a good mechanical performance at low temperatures.

WO 03/033586 describes polyethylene pipes made of ethylene/1-butene copolymer resins for hot fluid applications. Although meeting the DIN 16833 requirements the mechanical performance of these materials over a broad temperature range needs to be improved.

EP 1 927 627 describes polyethylene pipes with improved high temperature resistance. The polyethylene resins are polymerized in the presence of a metallocene catalyst which results in good mechanical performance. However, due to the narrow molecular weight distribution of the resins the processability and pipe surface quality is low.

There is a need for polyethylene resins which overcome the above mentioned drawbacks and show the optimal balance between flexibility, processability and good pipe surface quality while still meeting the requirements of DIN 16833 and a good mechanical performance over a broad temperature range.

SUMMARY OF THE INVENTION

The present invention is based on the surprising finding that polyethylene pipes with improved mechanical properties, such as pressure resistance, over a broad temperature range can be provided if made from a polyethylene composition comprising, preferably consisting of, a base resin comprising a copolymer of ethylene and at least two comonomers selected from alpha-olefins having from three to twelve carbon atoms, wherein the ethylene copolymer comprises a low molecular weight component (A) and a high molecular weight component (B) with the low molecular weight component (A) having a lower weight average molecular weight than the high molecular weight component (B), and optional additives, wherein the base resin has a density of more than 940.0 kg/m³ to equal to or less than 948.0 kg/m³, determined according to ISO 1183, and the composition has a melt flow rate $MFR_5$ (190° C., 5 kg) of equal to or more than 0.3 g/10 min to equal to or less than 1.3 g/10 min, determined according to ISO 1133.

The polyethylene compositions of the present invention surprisingly have an optimal balance between 1) mechanical property performance, preferably at least flexibility property, such as flexural and tensile modulus, 2) processability and extrusion properties, as well as 3) good pipe surface quality, while still meeting the hydrostatic pressure requirements of DIN 16833, preferably DIN 16833, type II.

The present invention therefore provides a polyethylene composition comprising, preferably consisting of, a base resin comprising a copolymer of ethylene and at least two comonomers selected from alpha-olefins having from three to twelve carbon atoms, wherein the ethylene copolymer comprises a low molecular weight component (A) and a high molecular weight component (B) with the low molecular weight component (A) having a lower weight average molecular weight than the high molecular weight component (B), and optional additives, wherein the base resin has a density of more than 940.0 kg/m³ to equal to or less than 948.0 kg/m³, determined according to ISO 1183, and the composition has a melt flow rate $MFR_5$ (190° C., 5 kg) of equal to or more than 0.3 g/10 min to equal to or less than 1.3 g/10 min, determined according to ISO 1133.

The present invention further provides a polyethylene composition obtainable by a multistage process, the multistage process comprising a) polymerizing ethylene and an alpha-olefin comonomer having from 3 to 12 carbon atoms in the presence of a Ziegler-Natta catalyst for obtaining an intermediate material, b) transferring the intermediate material to a gas phase reactor
 (i) feeding ethylene and an alpha-olefin comonomer having from 3 to 12 carbon atoms different to the alpha-olefin comonomer of step a) to the gas phase reactor
 (ii) further polymerizing the intermediate material to obtain a base resin which comprises the intermediate material polymerized in step a) and a material polymerized in step b) which has a higher weight average molecular weight as the intermediate material of step a), wherein the base resin has a density of more than 940.0 kg/m³ to equal to or less than 948.0 kg/m³, determined according to ISO 1183, c) extruding the base resin, optionally in the presence of further additive(s), into a polyethylene composition having a melt flow rate MFR$_5$ (5 kg, 190° C.) of equal to or more than 0.3 g/10 min to equal to or less than 1.3 g/10 min, determined according to ISO 1133.

In a further aspect, the present invention provides an article comprising the polyethylene composition according to the present invention.

In yet a further aspect, the present invention is concerned with the use of the inventive polyethylene composition for the production of an article.

Thereby, it is preferred that the article relates to a pipe or a pipe fitting, more preferably a pipe.

Definitions

A polyethylene composition according to the present invention denotes a polymer derived from at least 50 mol-% ethylene monomer units and additional comonomer units.

An ethylene homopolymer thereby denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

An ethylene copolymer denotes a polymer consisting of ethylene monomer units and comonomer units in an amount of at least 0.1 mol %. In an ethylene random copolymer the comonomer units are randomly distributed in the polymer chain.

The term 'base resin' denotes the polymeric component of the composition.

The term 'different' denotes that a polymeric component differs from another polymeric component in at least one measureable property. Suitable properties for differentiating polymeric components are weight average molecular weight, melt flow rate MFR$_2$ or MFR$_5$, density or comonomer content.

General

Base Resin

The base resin comprises a copolymer of ethylene and at least two comonomers selected from alpha-olefins having from three to twelve carbon atoms.

Preferably the alpha olefin comonomers of the ethylene copolymer are selected from alpha olefins having from 4 to 8 carbon atoms, such as 1-butene, 1-hexene, 4-methyl-1-pentene and 1-octene. Especially preferred are 1-butene and 1-hexene.

The ethylene copolymer may further comprise further comonomer units different from alpha olefin comonomers such as dienes, polar comononers or silicon containing comonomers. It is, however, preferred that the ethylene copolymer only contains alpha olefin monomers as comonomer units.

The ethylene copolymer comprises a low molecular weight component (A) and a high molecular weight component component (B). The low molecular weight component (A) differs from the high molecular weight component (B) by having a lower weight average molecular weight.

Preferably the base resin consists of the copolymer of ethylene and at least two comonomers selected from alpha-olefins having from three to twelve carbon atoms.

In one embodiment of the present invention the ethylene copolymer consists of the low molecular weight component (A) and the high molecular weight component (B).

In another embodiment of the present invention the ethylene copolymer may further comprise further polymer component(s) different to the low molecular weight component (A) and the high molecular weight component (B). The further polymer component(s) can be introduced to the ethylene copolymer, the base resin or the polyethylene composition either by melt mixing or compounding or in an additional reaction stage of the multi-stage process for producing base resin of the polyethylene composition.

Components (A) and (B) differ in their weight average molecular weight in that that component (B) has a higher weight average molecular weight as component (A). The differences in weight average molecular weight can be seen from the melt flow rate MFR$_2$ of component (A) which is higher than the melt flow rate MFR$_5$ of the polyethylene composition.

The MFR$_2$ (2.16 kg, 190° C.) of component (A) is equal to or more than 200 g/10 min, preferably equal to or more than 220 g/10 min, most preferably equal to or more than 240 g/10 min.

Further, the MFR$_2$ (2.16 kg, 190° C.) of component (A) is equal to or less than 400 g/10 min, preferably equal to or less than 390 g/10 min, more preferably equal to or less than 380 g/10 min.

Component (A) can be an ethylene homopolymer. The homopolymer preferably has a density of at least 970 kg/m³ and preferably of more than 970 kg/m².

However, it is preferred that component (A) is a copolymer of ethylene with one or more alpha-olefins having from 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene. Mostly preferred is 1-butene.

The amount of the comonomer in component (A), if present, is preferably in the range of 0.1 mol % to 1.5 mol %, more preferably in the range of 0.2 mol % to 1.0 mol %, still more preferably in the range of 0.3 mol % to 0.8 mol % and most preferably in the in the range of 0.4 mol % to 0.7 mol %.

The low molecular weight component (A) preferably has a density of equal to or more than 955 kg/m³.

The low molecular weight component (A) preferably has a density of equal to or less than 965 kg/m³, more preferably of equal to or less than 963 kg/m³, and most preferably of equal to or less than 962 kg/m³.

Further, component (A) is preferably present in the base resin in an amount of 37 to 49 wt.-%, more preferably 37.5 to 45 wt.-%, more preferably 37.5 to 43 wt.-%.

The high molecular weight component (B) can be a copolymer of ethylene and at least two different alpha-olefin comonomers with 3 to 12 carbon atoms. In this embodiment the low molecular weight component (A) is preferably an ethylene homopolymer.

It is, however, preferred that component (B) is a copolymer of ethylene and one alpha-olefin comonomer which is selected from alpha-olefin comonomer units with 3 to 12 carbon atoms. In this preferred embodiment the low molecular weight component (A) is preferably an ethylene copolymer as defined above.

Thereby, the alpha-olefin comonomer(s) used in the ethylene/alpha-olefin copolymer of the high molecular weight component (B) preferably are different to that/those used in the ethylene/alpha-olefin copolymer of the low molecular weight component (A).

Preferably the alpha olefin comonomer(s) of component (B) is/are selected from alpha olefins having from 4 to 8 carbon atoms, such as 1-butene, 1-hexene, 4-methyl-1-pentene and 1-octene. Especially preferred are 1-butene and 1-hexene and mostly preferred is 1-hexene.

Component (B) may further comprise further comonomer units different from alpha olefin comonomers such as dienes, polar comonoers or silicon containing comonomers. It is, however, preferred that the component (B) only contains alpha olefin monomers as comonomer.

It is especially preferred that the component (B) contains either 1-butene and/or 1-hexene as comonomer. Mostly preferred is 1-hexene as comonomer for component (B).

The content of units derived from at least one alpha olefin comonomer having from 3 to 12 carbon atoms in fraction (B) is preferably 0.3 to 1.5 mol %, more preferably 0.4 to 1.4 mol %.

Further, component (B) is preferably present in the base resin in an amount of 63 to 51 wt.-%, more preferably 62.5 to 55 wt.-%, and most preferably 62.5 to 57 wt.-%.

Optionally, the ethylene copolymer further comprises a prepolymer fraction. The prepolymer fraction preferably is an ethylene homopolymer or copolymer. The optional prepolymer fraction is preferably present in an amount of 0 to 5 wt.-%, more preferably in an amount of 0.2 to 3.5 wt.-% and most preferably in an amount of 0.5 to 2.5 wt.-%.

As regards the amount of the different polyethylene components (A) and (B) in the ethylene copolymer and the weight ratios of components (A) and (B) the optional prepolymer fraction is counted to the amount and the weight of component (A).

In one embodiment of the present invention the ethylene copolymer consists only of above defined fractions (A) and (B).

In another embodiment of the present invention the ethylene copolymer consists of fractions (A) and (B) and a prepolymer fraction as defined above.

Most preferably the base resin consists of fractions (A) and (B) and the optional prepolymer fraction.

The base resin preferably has a density of equal to or more than 941.0 kg/m³, and, depending on the end application, the density may preferably be within the range of 942 to 948 kg/m³.

The content of units derived from at least two alpha olefin comonomers having from 3 to 12 carbon atoms in the base resin is preferably 0.25 to 2.5 mol %, more preferably 0.30 to 2.0 mol %, still more preferably 0.4 to 1.5 mol %, most preferably 0.60 to 1.1 mol %.

In one especially preferred embodiment, the base resin according to the present invention is a copolymer of ethylene with at least two, most preferably with two different alpha olefin comonomers having from 3 to 12 carbon atoms. The ethylene copolymer preferably comprises, most preferably consists of a low molecular weight fraction (A) and a high molecular weight fraction (B), with the low molecular weight component (A) having a lower weight average molecular weight than the high molecular weight component (B). Component (A) preferably is a copolymer of ethylene with one alpha-olefin comonomer. Component (B) preferably is a copolymer of ethylene with one alpha-olefin comonomer different to the alpha-olefin comonomer of component (A). Preferably the alpha olefin comonomers are selected from alpha olefins having from 4 to 8 carbon atoms, such as 1-butene, 1-hexene, 4-methyl-1-pentene and 1-octene. Especially preferred comonomers in component (B) are 1-butene and 1-hexene, most preferably 1-hexene. Thereby, 1-butene is the preferred comonomer in component (A).

Polyethylene Composition

In addition to the base resin, the polymer composition may comprise and preferably comprises usual additives for utilization with polyolefins, such as pigments (e.g. carbon black or coloured pigment), stabilizers (e.g. antioxidant agents), metal scavengers and/or UV-stabilizers, antistatic agents and utilization agents (such as processing aid agents). Preferably, the amount of these additives is 10 wt % or below, more preferably 8 wt % or below, more preferably 5 wt % or below, of the composition (100 wt %).

Further preferred, the amount of additives different from carbon black is 0 wt % to 1 wt %, more preferably 0.001 wt % to 1.0 wt %.

Part or all of the optional additives and or pigment may be incorporated to the base resin by the base resin producer during the production of base resin, e.g. during the pelletizing step of the base resin powder obtained from the polymerization reactor or by the article producer during the compounding step of the polymer composition.

The polyethylene composition, according to the present invention has a melt flow rate $MFR_5$ (190° C., 5 kg) of equal to or more than 0.3 g/10 min, preferably equal to or more than 0.4 g/10 min, and most preferably equal to or more than 0.44 g/10 min.

Further, the polyethylene composition has a melt flow rate $MFR_5$ (190° C., 5 kg) of equal to or less than 1.3 g/10 min, preferably equal to or less than 1.2 g/10 min, and most preferably equal to or less than 1.1 g/10 min.

The polyethylene composition according to the present invention preferably has a melt flow rate $MFR_{21}$ (190° C., 21.6 kg) of equal to or more than 6.0 g/10 min, more preferably equal to or more than 7.5 g/10 min, and most preferably equal to or more than 8.0 g/10 min.

Further, the polyethylene composition preferably has a melt flow rate $MFR_{21}$ (190° C., 21.6 kg) of equal to or less than 25.0 g/10 min, preferably equal to or less than 24.0 g/10 min, and most preferably equal to or less than 22.0 g/10 min.

It is preferred that the base resin has $MFR_5$ (190° C., 5 kg) and the $MFR_{21}$ (190° C., 21.6 kg) values in the same ranges as the polyethylene composition as defined above.

The $MFR_5$ (190° C., 5 kg) and the $MFR_{21}$ (190° C., 21.6 kg) are determined according to ISO 1133.

The polyethylene composition according to the present invention preferably has a density of equal to or more than 940.0 kg/m³, more preferably of 942 to 948, determined according to ISO 1183-1:2004.

The molecular weight distribution, being the ratio of the weight average molecular weight to the number average molecular weight, Mw/Mn, of the polyethylene composition is preferably 10 to 25, more preferably 11 to 20, most preferably 12 to 20.

The polyethylene composition preferably has a shear thinning index $SHI_{2.7/210}$ of 15 to 35, more preferably a shear thinning index $SHI_{2.7/210}$ of 18 to 32, and most preferably a shear thinning index $SHI_{2.7/210}$ of 20 to 30.

The shear thinning index $SHI_{2.7/210}$ is a rheological measure indicating the broadness of the polymer. Thus SHI can be modified e.g. by varying the relative amounts of low and high molecular weight material (via split of the reactors) and by varying the molecular weights of the respective low and high molecular weight materials for example by variation of the chain transfer agent feed.

The polyethylene composition according to the present invention preferably has a complex viscosity at 0.05 rad/s eta* of 20 000 Pa·s to 150 000 Pa·s, more preferably 25 000 Pa·s to 100 000 Pa·s, and most preferably 30 000 Pa·s to 80 000 Pa s.

The polyethylene composition according to the present invention preferably has a complex viscosity at 300 rad/s eta* of 650 Pa·s to 1250 Pa s, more preferably 700 Pa·s to 1200 Pa s, and most preferably 800 Pa·s to 1150 Pa s.

The composition according to the present invention has a molecular weight distribution, being the ratio of the weight average molecular weight to the number average molecular weight, Mw/Mn, of 10 to 20, preferably of 11.5 to 19, and most preferably of 13 to 18.

The polyethylene composition preferably has a weight average molecular weight Mw of 100,000 g/mol to 250,000 g/mol, preferably of 120,000 g/mol to 225,000 g/mol, and most preferably of 140,000 g/mol to 200,000 g/mol.

The multimodal base resin of the invention with two type of comonomers and a specific property balance between density and MFR provide highly advantageous mechanical properties e.g. for pipe applications (expressed e.g. as flexural modulus, tensile modulus, Charpy notched impact), processability properties, when the polyethylene composition is processed to articles, preferably pipes, as well as desirable resistance to internal pressure when tested using pipe samples of the polyethylene composition.

Accordingly, the composition of the present invention has a flexural modulus, determined according to ISO 178 at a temperature of 23° C. of equal to or less than 1000 MPa, preferably of equal to or less than 970 MPa, and most preferably of equal to or less than 940 MPa. The lower limit of the tensile modulus at 23° C. is usually not lower than 600 MPa, preferably not lower than 700 MPa.

The composition according to the present invention has a tensile modulus, determined according to ISO 527-2:1993 at a temperature of 23° C. of equal to or less than 900 MPa, preferably of equal to or less than 880 MPa, and most preferably of equal to or less than 860 MPa. The lower limit of the tensile modulus at 23° C. is usually not lower than 500 MPa, preferably not lower than 600 MPa.

The polyethylene composition according to the present invention preferably has a Charpy notched impact strength, determined according to ISO 179eA at a temperature of 23° C., of more than 15 kJ/m$^2$, preferably of at least 17 kJ/m$^2$, and most preferably of at least 18 kJ/m$^2$. The upper limit of the Charpy notched impact strength is usually not higher than 50 kJ/m$^2$.

The polyethylene composition according to the present invention preferably has a Charpy notched impact strength, determined according to ISO 179eA at a temperature of −20° C., of more than 6.5 kJ/m$^2$, preferably of at least 8.5 kJ/m$^2$, more preferably of at least 9.0 kJ/m$^2$, and most preferably of at least 9.5 kJ/m$^2$. The upper limit of the Charpy notched impact strength is usually not higher than 30 kJ/m$^2$.

The polyethylene composition preferably consists of the base resin as the polymer component(s), and, optionally, and preferably, additive(s). It is to be understood that preferable and optional additive(s) may be added to the polymer composition in form of a masterbatch, i.e. together with a carrier polymer. In such case the carrier polymer is not considered as polymer component(s), but is calculated to the amount of additive(s).

In a further aspect, the present invention is concerned with a polyethylene composition obtainable by a multistage process, the multistage process comprising
a) polymerizing ethylene and an alpha-olefin comonomer having from 3 to 12 carbon atoms in the presence of a Ziegler-Natta catalyst for obtaining an intermediate material,
b) transferring the intermediate material to a gas phase reactor (i) feeding ethylene and an alpha-olefin comonomer having from 3 to 12 carbon atoms different to the alpha-olefin comonomer of step a) to the gas phase reactor
(ii) further polymerizing the intermediate material to obtain a base resin which comprises the intermediate material polymerized in step a) and a material polymerized in step b) which has a higher weight average molecular weight as the intermediate material of step a), wherein the base resin has a density of more than 940.0 kg/m$^3$ to equal to or less than 948.0 kg/m$^3$, determined according to ISO 1183,
c) extruding the base resin, optionally in the presence of further additive(s), into a polyethylene composition having a melt flow rate MFR$_5$ (5 kg, 190° C.) of equal to or more than 0.3 g/10 min to equal to or less than 1.3 g/10 min, determined according to ISO 1133.

The base resin and the polyethylene composition obtainable by the above described multistage process are preferably further defined by the properties of the base resin and the polyethylene composition described above.

Article

In yet a further aspect, the present invention is concerned with an article comprising, preferably consisting of, the polyethylene composition as described above or below in claims.

Thereby, in the preferred embodiment of the present invention the article is a pipe or pipe fitting comprising, preferably consisting of, the polyethylene composition as described above or below in claims. Most preferably the article is a pipe.

Process

The polyethylene compositions of the present invention are usually made by a multi-stage process, i.e. a process which makes use of at least two reactors, one for producing a lower molecular weight component (A) and a second for producing a higher molecular weight component (B). These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

Multimodal polyethylene compositions of the present invention are preferably produced in a multistage process, where lower molecular weight and higher molecular weight polymers (components) are produced in different polymerization steps, in any order.

A relatively low density (or high molecular weight (HMW) fraction) polymer component can be prepared in the first polymerization step and the relatively high density (or low molecular weight (LMW) fraction) polymer component in the second polymerization step. This can be referred to as the reverse mode. Alternatively, the low molecular weight polymer component can be prepared in the first polymerization step and the high molecular weight polymer component in the second polymerization step. This can be referred to as the normal mode and is preferred.

A two-stage process can, for example be a slurry-slurry or a gas phase-gas phase process, particularly preferably a slurry-gas phase process. Optionally the process according to the invention can comprise one or two additional polymerization steps.

The slurry and gas phase stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

The slurry and gas phase processes are well known and described in the prior art.

In a preferred embodiment of the invention the low molecular weight (LMW) component is produced first and the high molecular weight (HMW) component is produced in the presence of LMW component. In this case the LMW component is the first polyethylene component (A) and the HMW component is the second polyethylene component (B).

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium or metallocene catalysts or late transition metal catalysts. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has an average particle size from 15 to 30 μm, preferably from 18 to 25 μm. Alternatively, the support may have an average particle size of from 30 a 80 μm, preferably from 30 to 50 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Another group of suitable Ziegler-Natta catalysts contains a titanium compound together with a magnesium halide compound acting as a support. Thus, the catalyst contains a titanium compound on a magnesium dihalide, like magnesium dichloride. Such catalysts are disclosed, for instance, in WO 2005/118655 and EP 810235.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100.

The catalyst system can be fed to any polymerisation stage but preferably is fed to the first polymerisation stage. Most preferably the catalyst system is only fed to the first polymerisation stage. The catalyst may be transferred into the polymerisation zone by any means known in the art. It is thus possible to suspend the catalyst in a diluent and maintain it as homogeneous slurry. Especially preferred is to use oil having a viscosity from 20 to 1500 mPa*s as diluent, as disclosed in WO-A-2006/063771. It is also possible to mix the catalyst with a viscous mixture of grease and oil and feed the resultant paste into the polymerisation zone. Still further, it is possible to let the catalyst settle and introduce portions of thus obtained catalyst mud into the polymerisation zone in a manner as disclosed, for instance, in EP-A-428 054.

The resulting end product consists of an intimate mixture of the polymers from the reactors, the different molecular-weight-distribution curves of these polymers together forming a molecular-weight-distribution curve having a broad maximum or several maxima, i.e. the end product is a multimodal polymer mixture.

It is preferred that the multimodal polyethylene composition according to the invention is a bimodal polyethylene mixture consisting of polymer components (A) and (B), optionally further comprising a small prepolymerisation fraction. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having a content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 65 to 115° C., more preferably is 70 to 100° C., and most preferably is 80 to 90° C., and the temperature in the gas-phase reactor preferably is 70 to 105° C., more preferably is 75 to 100° C., and most preferably is 82 to 97° C. The pressure in the loop reactor is typically from 1 to 150 bar, preferably from 1 to 100 bar and the pressure in the gas phase reactor is typically at least 10 bar, preferably at least 15 bar but typically not more than 30 bar, preferably not more than 25 bar.

The polymerisation in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerisation steps.

The ethylene content in the fluid phase of the slurry in the slurry phase reactor may be from 0.5 to 50% by mole, preferably from 1 to 20% by mole, and in particular from 2 to 10% by mole.

In a preferred embodiment of a gas phase reactor, the polymerization takes place in a fluidised bed gas phase reactor where an olefin is polymerised in the presence of a polymerisation catalyst in an upwards moving gas stream. The reactor typically contains a fluidised bed comprising the growing polymer particles containing the active catalyst located above a fluidisation grid. The polymer bed is fluidised with the help of a fluidisation gas comprising the olefin monomer, eventually comonomer(s), eventually chain growth controllers or chain transfer agents, such as hydrogen, and eventually inert gas.

Also antistatic agent(s) may be introduced into the gas phase reactor if needed. Suitable antistatic agents and methods to use them are disclosed, amongst others, in U.S. Pat. Nos. 5,026,795, 4,803,251, 4,532,311, 4,855,370 and EP-A-560 035. They are usually polar compounds and include, amongst others, water, ketones, aldehydes alcohols.

The polymerization process may further comprise a pre-polymerisation step which precedes the polymerisation steps. The purpose of the pre-polymerisation is to polymerise a small amount of polymer onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry.

Thus, the pre-polymerisation step may be conducted in a loop reactor. The pre-polymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 80° C. and more preferably from 40° C. to 70° C.

The pressure is not critical and is typically from 1 bar to 150 bar, preferably from 10 bar to 100 bar.

A chain-transfer agent, preferably hydrogen, is added as required to the reactors, and preferably 200 to 500 moles of $H_2$/kmoles of ethylene are added to the reactor, when the LMW component is produced in this reactor, and 0 to 100 moles of $H_2$/kmoles of ethylene are added to the gas phase reactor when this reactor is producing the HMW component.

The polymerization conditions as well as the feed streams and the residence time in the reactors are preferably adapted as such to produce a base resin as described above or in the claims below.

Optionally, additives or other polymer components can be added to the composition during the compounding step in the amount as described above. Preferably, the polyethylene composition of the invention obtained from the reactor is compounded in the extruder together with additives in a manner known in the art.

The composition of the invention, preferably if produced in a process comprising a compounding step, wherein the composition, i.e. the blend, which is typically obtained as a polyolefin base resin powder from the reactor, is extruded in an extruder and then pelletized to polymer pellets in a manner known in the art. The extruder may be e.g. any conventionally used extruder. As an example of an extruder for the present compounding step may be those supplied by Japan Steel works, Kobe Steel or Farrel-Pomini, e.g. JSW 460P or JSW CIM90P.

Use

Furthermore, the present invention relates to an article, preferably a pipe and to the use of such a polyethylene composition for the production of an article, preferably a pipe or pipe fitting, most preferably a pipe.

Pipes can be produced from the polyethylene composition according to the present invention according to the methods known in the art. Thus, according to one preferred method the polyethylene composition is extruded through an annular die to a desired internal diameter, after which the polyethylene composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 metres or more.

The fittings can be produced by conventional moulding processes, like injection moulding processes, which are well known to a skilled person.

EXAMPLES

1. Definitions
   a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature of 190° C. and a load of 5 kg, the $MFR_2$ of polyethylene at a temperature of 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

b) Density

Density of the polymer was measured according to ISO 1183-1:2004 Method A on compression moulded specimen prepared according to EN ISO 1872-2 (February 2007) and is given in kg/m³.

c) Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]} and the RSHEPT decoupling scheme {[4], [5]}. A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal ($\delta+$) at 30.00 ppm {[9]}.

Characteristic signals corresponding to the incorporation of 1-hexene were observed {[9]} and all contents calculated with respect to all other monomers present in the polymer.

$$H=I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total}=H$$

Characteristic signals resulting from saturated end-groups were observed. The content of such saturated end-groups was quantified using the average of the integral of the signals at 22.84 and 32.23 ppm assigned to the 2s and 3s sites respectively:

$$S=(1/2)*(I_{2S}+I_{3S})$$

The relative content of ethylene was quantified using the integral of the bulk methylene ($\delta+$) signals at 30.00 ppm:

$$E=(1/2)*I_{\delta+}$$

The total ethylene comonomer content was calculated based on the bulk methylene signals and accounting for ethylene units present in other observed comonomer sequences or end-groups:

$$E_{total}=E+(5/2)*B+(3/2)*S$$

The total mole fraction of 1-hexene in the polymer was then calculated as:

$$fH=(H_{total}/(E_{total}+H_{total})$$

The total comonomer incorporation of 1-hexene in mole percent was calculated from the mole fraction in the usual manner:

$$H[\text{mol \%}]=100*fH$$

The total comonomer incorporation of 1-hexene in weight percent was calculated from the mole fraction in the standard manner:

$$H[\text{wt \%}]=100*(fH*84.16)/((fH*84.16)+((1-fH)*28.05))$$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Pollard, M., Klimke, K., Graf, R., Spiess, H.W., Wilhelm, M., Sperber, O., Piel, C., Kaminsky, W., Macromolecules 2004; 37:813.

[4] Filip, X., Tripon, C., Filip, C., J. Mag. Reson. 2005, 176, 239.

[5] Griffin, J. M., Tripon, C., Samoson, A., Filip, C., and Brown, S. P., Mag. Res. in Chem. 2007, 45, S1, S198.

[6] Castignolles, P., Graf, R., Parkinson, M., Wilhelm, M., Gaborieau, M., Polymer 50 (2009) 2373.

[7] Zhou, Z., Muemmerle, R., Qiu, X., Redwine, D., Cong, R., Taha, A., Baugh, D. Winniford, B., J. Mag. Reson. 2007, 187, 225.

[8] Busico, V., Carbonniere, P., Cipullo, R., Pellecchia, R., Severn, J., Talarico, G., Macromol. Rapid Commun. 2007, 28, 1128.

[9] J. Randall, Macromol. Sci., Rev. Macromol. Chem. Phys. 1989, C29, 201.

d) Dynamic Shear Measurements (Frequency Sweep Measurements)

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.0154 and 500 rad/s and setting a gap of 1.2 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \tag{1}$$

If the applied strain is within the linear viscoelastic regime, the resulting sinusoidal stress response can be given by $$\sigma(t) = \sigma_0 \sin(\omega t + \delta) \tag{2}$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, $\eta^*$, the dynamic shear viscosity, $\eta'$, the out-of-phase component of the complex shear viscosity, $\eta''$, and the loss tangent, tan $\eta$, which can be expressed as follows:

$$G' = \frac{\sigma_0}{\gamma_0} \cos\delta \text{ [Pa]} \tag{3}$$

$$G'' = \frac{\sigma_0}{\gamma_0} \sin\delta \text{ [Pa]} \tag{4}$$

$$G^* = G' + iG'' \text{ [Pa]} \tag{5}$$

$$\eta^* = \eta' - i\eta'' \text{ [Pa·s]} \tag{6}$$

$$\eta' = \frac{G'}{\omega} \text{ [Pa·s]} \tag{7}$$

$$\eta'' = \frac{G'}{\omega} \text{ [Pa·s]} \tag{8}$$

Besides the above mentioned rheological functions one can also determine other rheological parameters such as the so-called elasticity index El(x). The elasticity index El(x) is the value of the storage modulus, G', determined for a value of the loss modulus, G", of x kPa and can be described by equation 9.

$$El(x) = G' \text{ for } (G'' = x \text{ kPa}) \text{ [Pa]} \tag{9}$$

For example, the El(5 kPa) is defined by the value of the storage modulus G', determined for a value of G" equal to 5 kPa.

The determination of so-called Shear Thinning Indexes is done, as described in equation 10.

$$SHI(x/y) = \frac{Eta^* \text{ for } (G^* = x \, kPa)}{Eta^* \text{ for } (G^* = y \, kPa)} \text{ [Pa]} \tag{10}$$

For example, the $SHI_{(2.7/210)}$ is defined by the value of the complex viscosity, in Pa·s, determined for a value of G* equal to 2.7 kPa, divided by the value of the complex viscosity, in Pa·s, determined for a value of G* equal to 210 kPa.

The values of storage modulus (G'), loss modulus (G"), complex modulus (G*) and complex viscosity ($\eta^*$) were obtained as a function of frequency ($\omega$).

Thereby, e.g. $\eta^*_{300 \, rad/s}$ (eta$^*_{300 \, rad/s}$) is used as abbreviation for the complex viscosity at the frequency of 300 rad/s and $\eta^*_{0.05 \, rad/s}$ (eta$^*_{0.05 \, rad/s}$) is used as abbreviation for the complex viscosity at the frequency of 0.05 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

References:
[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995.).
[3] Definition of terms relating to the non-ultimate mechanical properties of polymers, Pure & Appl. Chem., Vol. 70, No. 3, pp. 701-754, 1998.

e) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\Sigma(A_i / M_i)} \tag{1}$$

$$M_w = \frac{\sum_{i=1}^{N} (A_i \times M_i)}{\Sigma A_i} \tag{2}$$

$$M_z = \frac{\sum_{i=1}^{M} (A_i \times M_i^2)}{\Sigma(A_1 / M_1)} \tag{3}$$

For a constant elution volume interval $\Delta V_i$, where $A_i$ and $M_i$ are the chromatographic peak slice area and polyolefin molecular weight (MW).

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4- methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0,5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at 160° C. under continuous gentle shaking in the autosampler of the GPC instrument.

f) Flexural Modulus

The flexural modulus was determined according to ISO 178. The test specimens having a dimension of 80×10×4.0 mm$^3$ (length×width×thickness) were prepared by injection molding according to EN ISO 1873-2. The length of the span between the supports was 64 mm, the test speed was 2 mm/min and the force was 100 N.

g) Tensile Modulus (23° C.)

As a measure for stiffness, the tensile modulus (E-modulus) of the compositions was measured at 23° C. on compression molded specimens according to ISO 527-2:1993. The specimens (1B type) were cut from plaques of 4 mm thickness prepared by compression molding according to ISO 293:2004 using the conditions defined in chapter 3.3 of ISO 1872-2:2007. The modulus was measured at a speed of 1 mm/min.

h) Tensile Properties (23° C.)

The tensile strength, including tensile stress at yield, strain at yield and elongation at break (i.e. tensile strain at break) is measured according to ISO 527-1 (cross head speed 50 mm/min) at a temperature of 23° C.

i) Charpy Notched Impact Strength

Charpy impact strength was determined according to ISO179/1eA:2000 on V-notched samples of 80*10*4 mm$^3$ at 23° C. (Charpy impact strength (23° C.)) and −20° C. (Charpy impact strength (−20° C.)). Samples were cut from plaques of 4 mm thickness prepared by compression molding according to ISO 293:2004 using the conditions defined in chapter 3.3 of ISO 1872-2:2007.

j) Pressure Test on Un-notched Pipes (PT); Resistance to Internal Pressure

The resistance to internal pressure has been determined in a pressure test on pressure test on un-notched 32 mm SDR 11 pipes having a length of 450 mm is carried out in water-inside and water-outside or water-inside and air-outside (as specified in table 3) environment according to ISO 1167-1:2006. End caps of type A were used. The time to failure is determined in hours. The conditions as given in the table 3 were applied.

2. Examples a) Preparation of the Catalyst

Complex Preparation:

87 kg of toluene was added to the reactor. Then 45.5 kg BOMAG-A in heptanes was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

275 kg silica (ES747JR of Crossfield, having an average particle size of 20 μm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during 10 minutes. The slurry was stirred for 8 hours at 50° C. Finally, 52 kg TiCl$_4$ was added during 0.5 hours at 45° C. The slurry was stirred at 40° C. for five hours. The catalyst was then dried by purging with nitrogen.

b) Polymerization of Inventive Example IE1

A loop reactor having a volume of 500 dm$^3$ was operated at 85° C. and 59 bar pressure. For producing a copolymer component of ethylene and 1-butene ethylene, 1-butene as comonomer and of hydrogen were introduced into the reactor in the ratios as disclosed in Table 1. In addition, the catalyst prepared as described above was introduced into the reactor together with triethylaluminium cocatalyst in the amounts as disclosed in Table 1. The polymerisation rate was 35 kg/h and the conditions in the reactor are shown in Table 1.

The polymer slurry was withdrawn from the loop reactor and transferred into a flash vessel operated at 3 bar pressure and 70° C. temperature where the hydrocarbons were substantially removed from the polymer. The polymer was then introduced into a gas phase reactor operated at a temperature of 85° C. and a pressure of 20 bar. In addition ethylene, 1-hexene, nitrogen as inert gas and hydrogen was introduced into the reactor whereby the molar 1-hexene to ethylene ratio and the molar hydrogen to ethylene ratio as well as the production split, the melt flow rates and the density of the polymers of IE1 withdrawn from the gas phase reactor are listed in Table 1. The polymerisation rate was about 54 kg/h. The conditions are shown in Table 1.

The resulting polymer was purged with nitrogen (about 50 kg/h) for one hour, stabilised with 6000 ppm of a stabilizer pack containing 10 wt % Ca-stearate, 10 wt % Irganox 1010, 20 wt % Irgafos 168, 20 wt % Irganox MD 1024 and and 40 wt % Irganox 1330 then extruded to pellets in a counter-rotating twin screw extruder CIM90P (manufactured by Japan Steel Works).

c) Inventive Examples IE2-IE5 and Comparative Examples CE1-CE3

Inventive Examples IE2-IE5 and Comparative Examples CE1-CE3 were polymerized using the same catalyst and cocatalyst components and the same reactor configuration as Inventive Example IE1. The polymerization conditions and feeds to the different reactors are shown in Table 1. For Comparative Example CE1 an ethylene homopolymer component instead of a 1-butene-ethylene copolymer component was polymerized in the loop reactor. The resultant base resins of Inventive Examples IE2-IE5 and Comparative Examples CE1-CE3 were treated and compounded as Inventive Example IE1.

d) Pipe Preparation

The compounded compositions of Inventive Examples IE1-IE5 and Comparative Examples CE1-CE3 were extruded to SDR 11 pipes for the pressure resistance tests in a Battenfeld 1-60-35-B extruder at a screw speed of about 200 rpm, and the conditions as listed in Table 2. The temperature profile in each barrel zone was 220/215/210/210/210° C.

The results of the pressure tests are shown in Table 3. For each condition in the pressure test one pipe was tested.

TABLE 1

| Polymerization conditions | | | | | | | | |
|---|---|---|---|---|---|---|---|---|
| | IE1 | IE2 | IE3 | IE4 | IE5 | CE1 | CE2 | CE3 |
| Loop: | | | | | | | | |
| Temperature [° C.] | 85 | 85 | 85 | 85 | 85 | 85 | 85 | 85 |
| Pressure [bar] | 59 | 59 | 59 | 59 | 59 | 59 | 59 | 59 |
| $H_2/C_2$ [mol/kmol] | 340 | 310 | 320 | 310 | 320 | 380 | 340 | 320 |
| $C_4/C_2$ [mol/kmol] | 288 | 259 | 262 | 275 | 444 | 0 | 305 | 286 |
| $C_2$-concentration [mol %] | 4.4 | 4.0 | 3.8 | 3.7 | 3.5 | 4.0 | 4.1 | 4.4 |
| Catalyst feed [g/h] | 9.4 | 9.5 | 11.2 | 9.3 | 10.7 | 19.9 | 9.7 | 8.7 |
| Cocatalyst feed [g/h] | 6.0 | 6.0 | 6.0 | 6.0 | 6.0 | 11.5 | 6.7 | 6.0 |
| Production Rate [kg/h] | 35 | 35 | 35 | 35 | 36 | 35 | 35 | 35 |
| Split [wt %] | 39 | 39 | 40 | 40 | 40 | 39 | 40 | 40 |
| $MFR_2$ [g/10 min] | 297 | 276 | 251 | 276 | 363 | 273 | 304 | 243 |
| Density [kg/m³] | 960.2 | 959.7 | 960.3 | 959.7 | 956.5 | >970 | 959.6 | 959.7 |
| Gas phase: | | | | | | | | |
| Temperature [° C.] | 85 | 85 | 85 | 85 | 85 | 85 | 85 | 85 |
| Pressure [bar] | 20 | 20 | 20 | 20 | 20 | 20 | 20 | 20 |
| $H_2/C_2$ | 36 | 16 | 32 | 24 | 25 | 32 | 37 | 47 |
| $C_6/C_2$ [mol/kmol] | 28 | 55 | 64 | 64 | 54 | 41 | 12 | 23 |
| $C_2$-concentration [mol %] | 19 | 18 | 16 | 15 | 17 | 9 | 15 | 18 |
| Production Rate [kg/h] | 54 | 54 | 53 | 53 | 54 | 54 | 53 | 52 |
| Split [wt %] | 61 | 61 | 60 | 60 | 60 | 61 | 60 | 60 |
| Density [kg/m³] | 947 | 941 | 941 | 941 | 941 | 944 | 950 | 949 |
| Composition Properties: | | | | | | | | |
| Density [kg/m³] | 947.0 | 941.4 | 941.8 | 941.0 | 941.3 | 944.9 | 950.1 | 949.1 |
| $MFR_5$ [g/10 min] | 0.61 | 0.45 | 1.13 | 0.77 | 0.63 | 0.78 | 0.55 | 0.96 |
| $MFR_{21}$ [g/10 min] | 11.0 | 8.7 | 21.0 | 14.7 | 12.2 | 14.4 | 10.0 | 17.0 |
| $FRR_{21/5}$ | 18.0 | 19.3 | 18.6 | 19.1 | 19.4 | 18.5 | 18.2 | 17.7 |
| Mw [kg/mol] | 169 | 190 | 149 | 162 | 169 | 158 | 171 | 151 |
| MWD (Mw/Mn) | 15.4 | 17.1 | 14.0 | 14.9 | 14.7 | 17.2 | 16.5 | 13.8 |
| Eta (0.05 rad/s) [Pa · s] | 53100 | 78300 | 33300 | 46600 | 53600 | 44300 | 58600 | 36200 |
| Eta (300 rad/s) [Pa · s] | 1050 | 1130 | 890 | 970 | 1010 | 670 | 1080 | 950 |
| $SHI_{2.7/210}$ | 22.2 | 27.6 | 21.3 | 24.2 | 23.7 | 22.0 | 22.5 | 19.8 |
| $C_4$ content [mol %] | 0.2 | 0.2 | 0.2 | 0.2 | 0.2 | 0 | 0.2 | 0.2 |
| $C_6$ content [mol %] | 0.3 | 0.6 | 0.8 | 0.7 | 0.6 | 0.6 | 0.1 | 0.2 |
| Flexural Modulus [MPa] | 929 | 789 | 781 | 758 | 775 | 927 | 1050 | 1000 |
| Tensile Modulus [MPa] | 851 | 692 | 692 | 681 | 699 | 873 | 911 | 910 |
| Tensile Strength [MPa] | 28.1 | 29.5 | 30.3 | 29.5 | 29.7 | 31.9 | 25.1 | 24.1 |
| Elongation at break [%] | >700 | >700 | >700 | >700 | >700 | 693 | 560 | 550 |
| Charpy NIS (23° C.) [kJ/m²] | 19.5 | 37.2 | 34.2 | 31.5 | 28.7 | 32.7 | 16.5 | 15.0 |
| Charpy NIS (−20° C.) [kJ/m²] | 10.2 | 17.4 | 9.9 | 9.5 | 10.2 | 12.4 | 9.6 | 7.3 |

TABLE 2

| Pipe Extrusion | | | | | | | | |
|---|---|---|---|---|---|---|---|---|
| | IE1 | IE2 | IE3 | IE4 | IE5 | CE1 | CE2 | CE3 |
| Torque [%] | 76 | 74 | 68 | 70 | 72 | 73 | 76 | 73 |
| Melt Pressure [bar] | 230 | 234 | 186 | 206 | 217 | 212 | 240 | 202 |
| Melt Temperature [° C.] | 223 | 226 | 221 | 222 | 226 | 222 | 220 | 218 |
| Pipe Quality | Good | Good | Good | Good | Die drool | Good | Good | good |

TABLE 3

| | Pressure test | | | |
|---|---|---|---|---|
| | Temperature [° C.] | Hoop Stress [MPa] | Failure Time [h] | Failure mode |
| IE1 | 20* | 11.82 | 197 | D |
| | | 11.33 | >907 | n.d. |
| | 70* | 6.59 | 164 | D |
| | | 6.50 | >907 | n.d. |
| | 95* | 4.29 | >883 | n.d. |
| | | 4.20 | >883 | n.d. |
| | 110** | 3.00 | 95 | D |
| | | 2.90 | >883 | n.d. |

TABLE 3-continued

Pressure test

| | Temperature [° C.] | Hoop Stress [MPa] | Failure Time [h] | Failure mode |
|---|---|---|---|---|
| IE2 | 20* | 11.83 | 44 | D |
| | | 11.28 | 71 | D |
| | 70* | 6.58 | 1.1 | D |
| | | 6.47 | 1.3 | D |
| | 95* | 4.34 | 5.2 | D |
| | | 4.21 | 3.3 | D |
| | 110** | 3.00 | 122 | D |
| | | 2.90 | 13 | D |
| IE3 | 20* | 11.80 | 18 | D |
| | | 11.29 | 139 | D |
| | 70* | 6.60 | 0.7 | D |
| | | 6.49 | 5.3 | D |
| | 95* | 4.31 | 1.6 | D |
| | | 4.19 | 4.5 | D |
| | 110** | 3.01 | 0.6 | D |
| | | 2.89 | 2.1 | D |
| IE4 | 20* | 11.77 | 44 | D |
| | | 11.32 | 74 | D |
| | 70* | 6.60 | 0.5 | D |
| | | 6.51 | 0.5 | D |
| | 95* | 4.28 | 1.3 | D |
| | | 4.21 | 2.1 | D |
| | 110** | 3.00 | 1.6 | D |
| | | 2.90 | 1.6 | D |
| IE5 | 20* | 11.83 | 43 | D |
| | | 11.32 | 123 | D |
| | 70* | 6.60 | 0.9 | D |
| | | 6.49 | 1.4 | D |
| | 95* | 4.30 | 2.4 | D |
| | | 4.20 | 27 | D |
| | 110** | 3.00 | 4.4 | D |
| | | 2.90 | 19 | D |
| CE1 | 20* | 11.80 | 253 | D |
| | | 11.30 | >355 | n.d. |
| | 70* | 6.61 | 8.8 | D |
| | | 6.49 | 146 | D |
| | 95* | 4.30 | 40 | D |
| | | 4.19 | >355 | n.d. |
| | 110** | 2.99 | 59 | D |
| | | 2.90 | >355 | n.d. |
| CE2 | 20* | 11.37 | >1243 | n.d. |
| | | 11.28 | >1243 | n.d. |
| | 70* | 6.58 | 571 | B |
| | | 6.49 | 648 | B |
| | 95* | 4.39 | 140 | B |
| | | 4.30 | 92 | B |
| | 110** | 3.09 | 144 | B |
| | | 3.00 | 72 | B |
| CE3 | 20* | 11.80 | >427 | n.d. |
| | | 11.32 | >427 | n.d. |
| | 70* | 6.60 | >427 | n.d. |
| | | 6.49 | >427 | n.d. |
| | 95* | 4.40 | 214 | B |
| | | 4.22 | 238 | B |
| | 110** | 2.99 | 319 | B |
| | | 2.92 | >406 | n.d. |

"more of" failure time (e.g. >489 h): test was not completed
Failure mode:
D = ductile failure mode
B = brittle failure mode
n.d. = test was not completed
*"water inside - water outside"
**"water inside - air outside"

The invention claimed is:

1. A polyethylene composition comprising
a base resin being a copolymer of ethylene and at least two different comonomers selected from alpha-olefins having from three to twelve carbon atoms,
wherein the ethylene copolymer comprises component (A) and component (B) wherein component (A) has a lower weight average molecular weight than component (B), and optional additives,
wherein the base resin has a density of more than 940.0 kg/m³ to equal to or less than 948.0 kg/m³, determined according to ISO 1183, and
the composition has a melt flow rate $MFR_5$ (190° C., 5 kg) of equal to or more than 0.3 g/10 min to equal to or less than 1.3 g/10 min, determined according to ISO 1133, and
a Charpy Notched Impact Strength at —20° C. of equal to or more than 6.5 kJ/m², determined according to ISO 179eA.

2. The polyethylene composition according to claim 1, wherein component (A) is a copolymer of ethylene and a comonomer selected from alpha-olefins having from three to twelve carbon atoms.

3. The polyethylene composition according to claim 2, wherein component (B) is a copolymer of ethylene and a comonomer selected from alpha-olefins having from three to twelve carbon atoms, which is different from the comonomer of component (A).

4. The polyethylene composition according to claim 1, wherein component (A) has a melt flow rate $MFR_2$ (190° C., 2.16 kg) of 200 to 400 g/10 min, determined according to ISO 1133.

5. The polyethylene composition according to claim 1, wherein component (A) has a density of equal to or more than 955 kg/m³, determined according to ISO 1183.

6. The polyethylene composition according to claim 1, wherein the composition has a weight average molecular weight Mw of 100,000 g/mol to 250,000 g/mol, determined by GPC.

7. The polyethylene composition according to claim 1, wherein the composition has a molecular weight distribution, being the ratio of weight average molecular weight to number average molecular weight Mw/Mn of 10 to 20, determined by GPC.

8. The polyethylene composition according to claim 1, wherein the composition has a shear thinning index $SHI_{2.7/210}$ of 15-35.

9. The polyethylene composition according to claim 1, wherein the composition has a melt flow rate $MFR_{21}$ (190° C., 21.6 kg) of 6.0 g/10 min to 25 g/10 min, determined according to ISO 1133.

10. The polyethylene composition according to claim 1, wherein the composition has a density of 942 to 948 kg/m³, determined according to ISO 1183.

11. The polyethylene composition according to claim 1, wherein the composition has a flexural modulus of equal to or less than 1000 MPa, determined according to ISO 178.

12. A process for making the polyethylene composition according to claim 1, the process comprising
a) polymerizing ethylene and an alpha-olefin comonomer having from 3 to 12 carbon atoms in the presence of a Ziegler-Natta catalyst for obtaining an intermediate material,
b) transferring the intermediate material to a gas phase reactor
(i) feeding ethylene and an alpha-olefin comonomer having from 3 to 12 carbon atoms different from the alpha-olefin comonomer of step a) to the gas phase reactor
(ii) further polymerizing the intermediate material with the ethylene and alpha-olefin comonomer of step b)(i),
to obtain a base resin which comprises the intermediate material polymerized in step a) and a material polymerized in step b) which has a higher weight average molecular weight as the intermediate material of step a), wherein the base resin has a density of more than 940.0 kg/m$^3$ to equal to or less than 948.0 kg/m$^3$, determined according to ISO 1183, extruding the base resin, in the presence of optional additives, into a polyethylene composition having a melt flow rate MFR$_5$ (5 kg, 190° C.) of equal to or more than 0.3 g/10 min to equal to or less than 1.3 g/10 min, determined according to ISO 1133 , and a Charpy Notched Impact Strength at −20° C. of equal to or more than 6.5 kJ/m$^2$, determined according to ISO 179eA.

13. An article comprising the polyethylene composition according to claim 1.

14. The article of claim 13, wherein the article is a pipe or pipe fitting.

* * * * *